Nov. 4, 1958   W. G. GRIMES   2,859,331
DIRIGIBLE EXTENDIBLE AND RETRACTABLE AIRCRAFT LANDING LIGHT
Original Filed Nov. 10, 1952   6 Sheets-Sheet 1
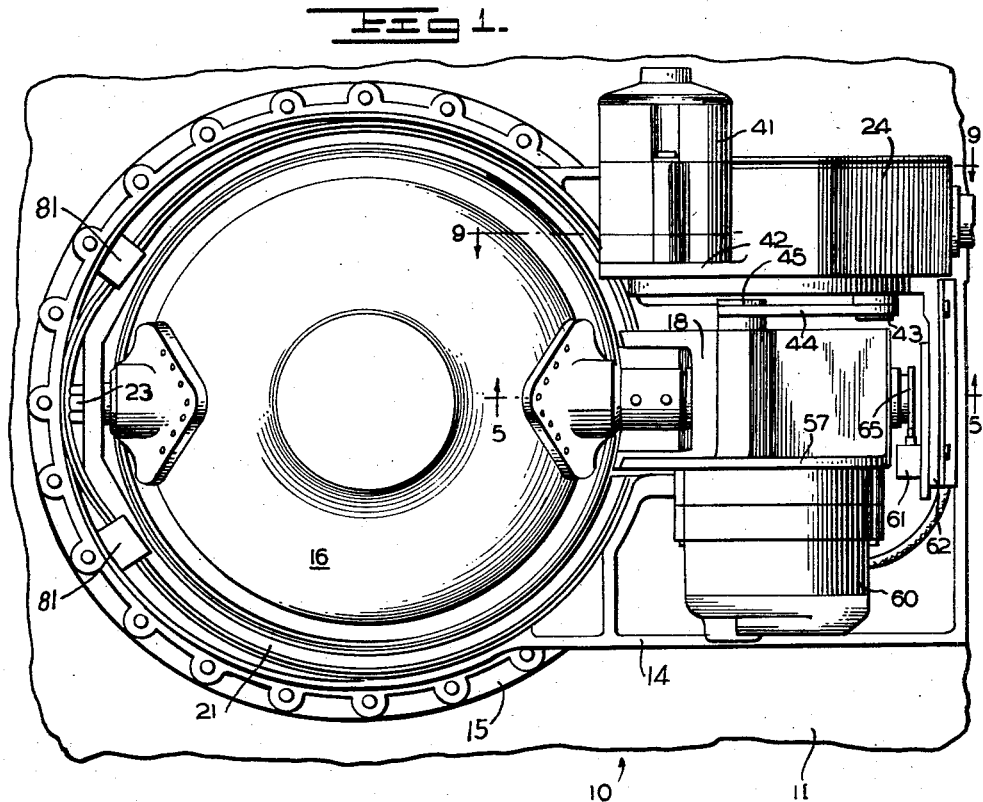
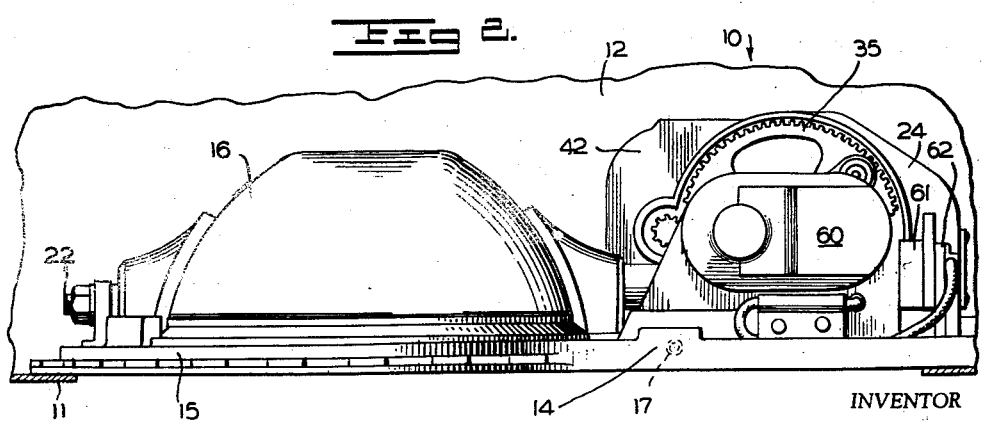
INVENTOR
WARREN G. GRIMES
BY Cushman, Darby & Cushman
ATTORNEYS Nov. 4, 1958 W. G. GRIMES 2,859,331
DIRIGIBLE EXTENDIBLE AND RETRACTABLE AIRCRAFT LANDING LIGHT
Original Filed Nov. 10, 1952 6 Sheets-Sheet 2
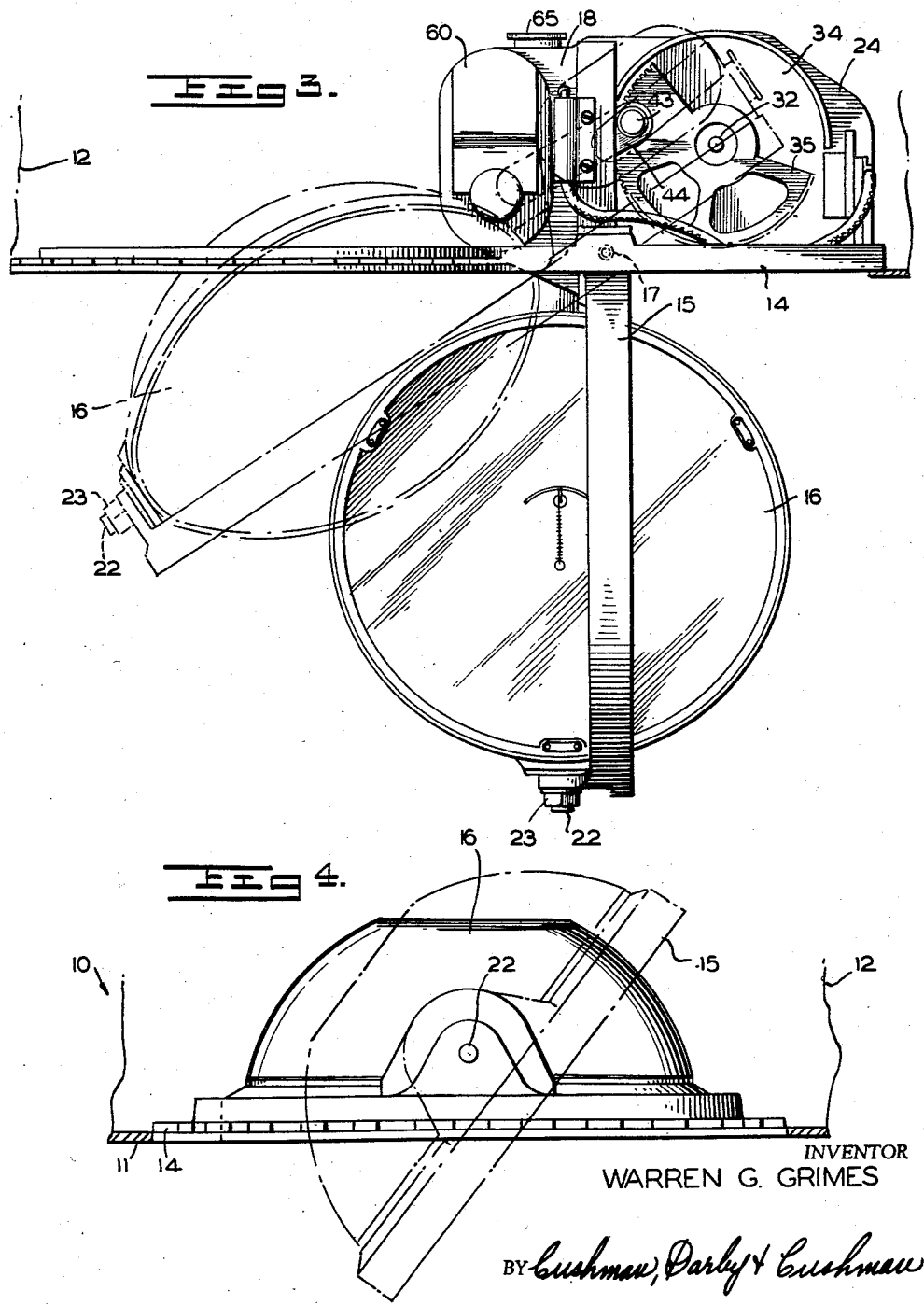
INVENTOR
WARREN G. GRIMES
BY Cushman, Darby & Cushman
ATTORNEYS

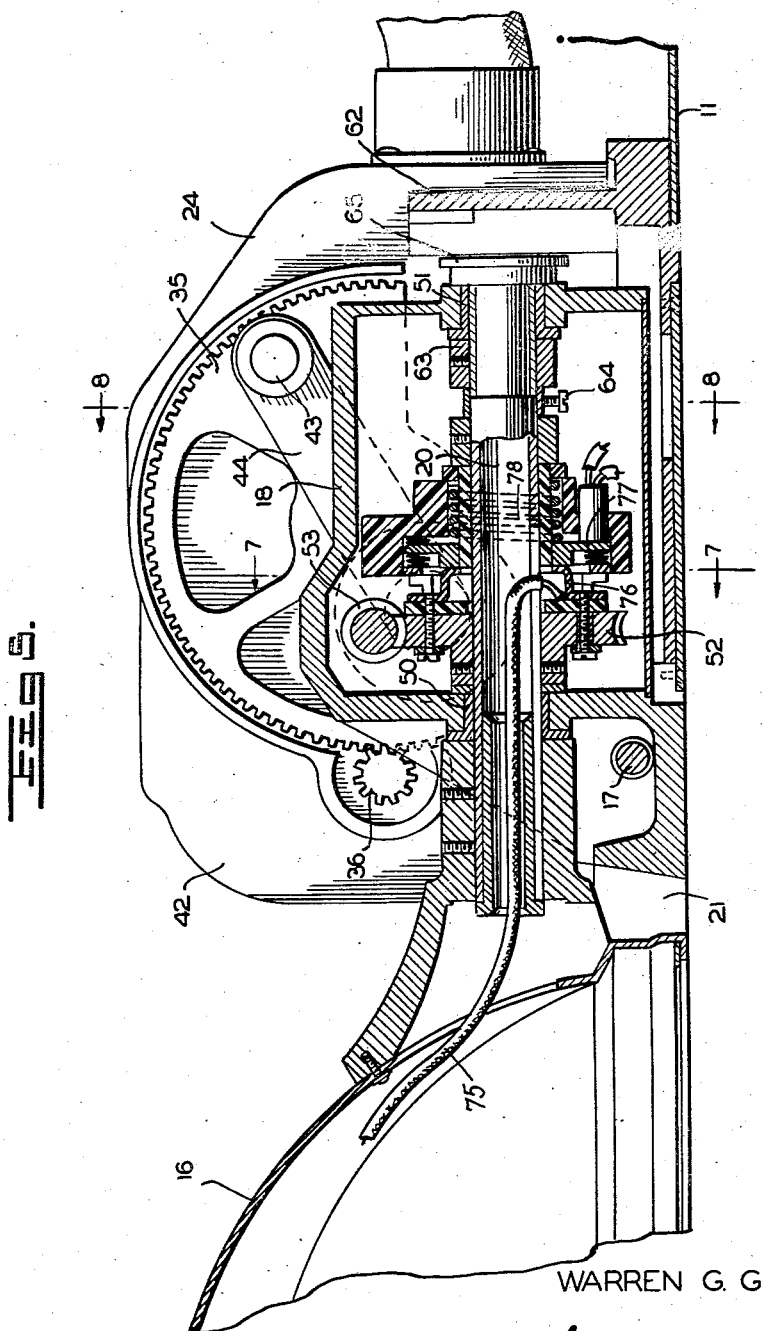

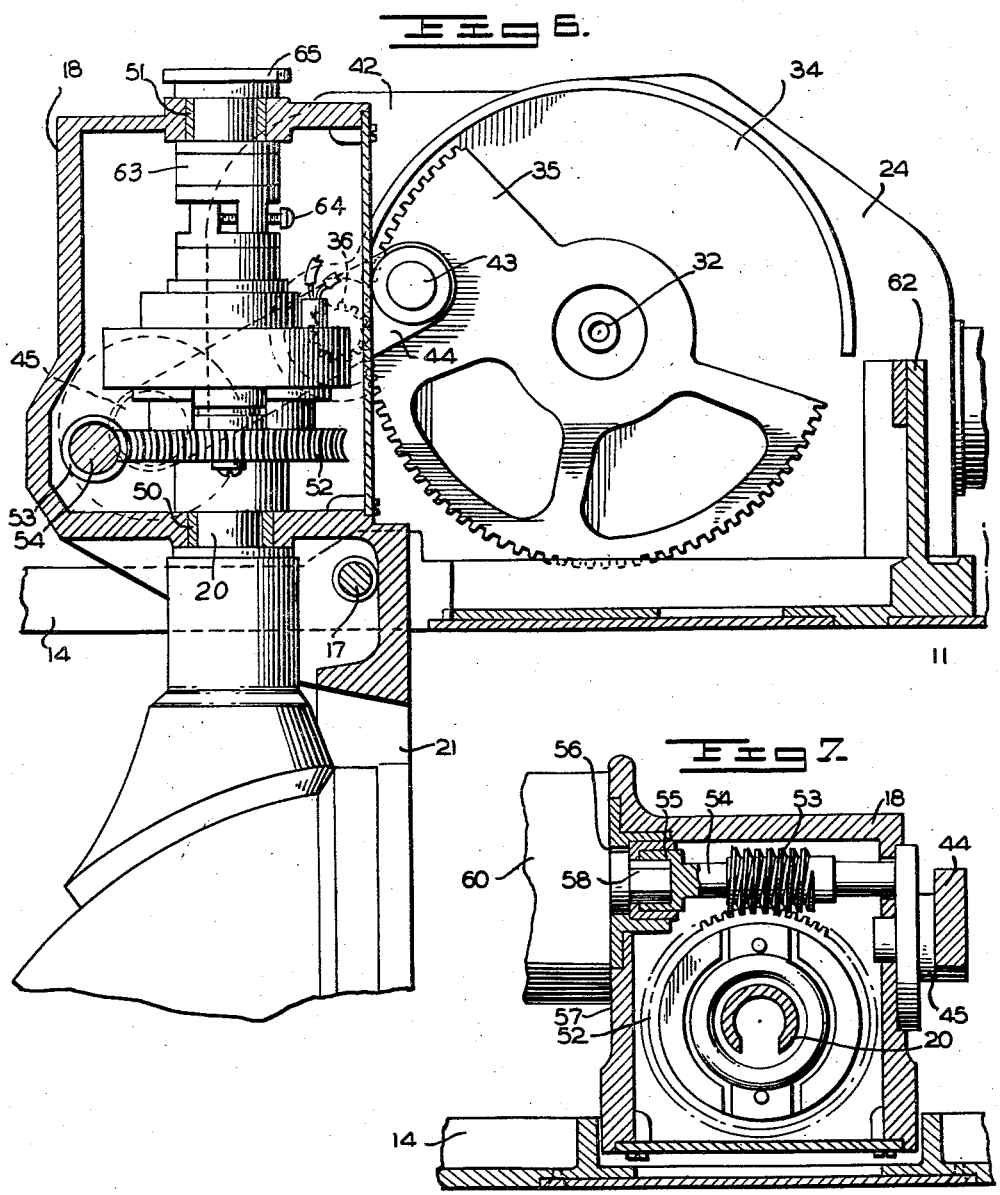

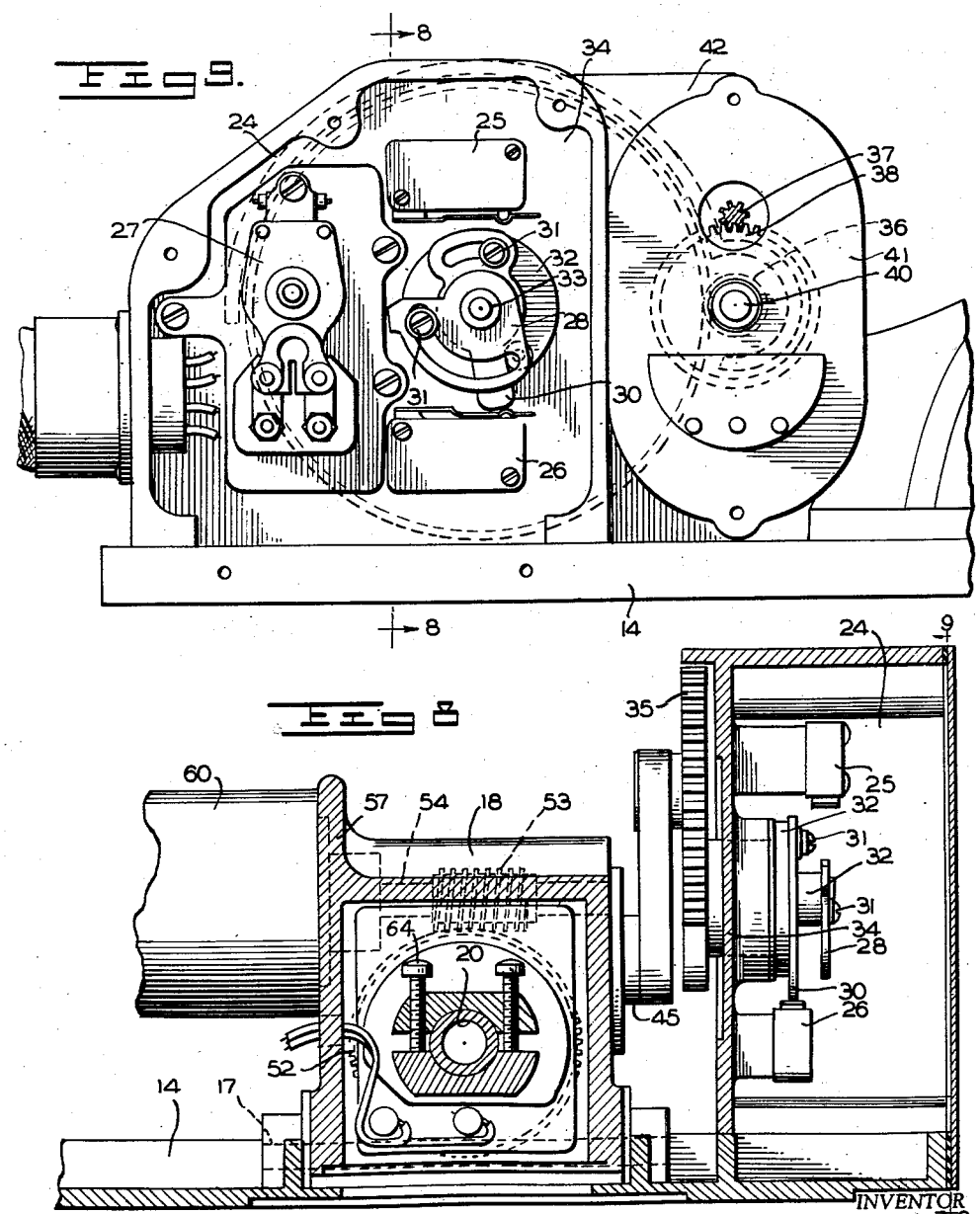

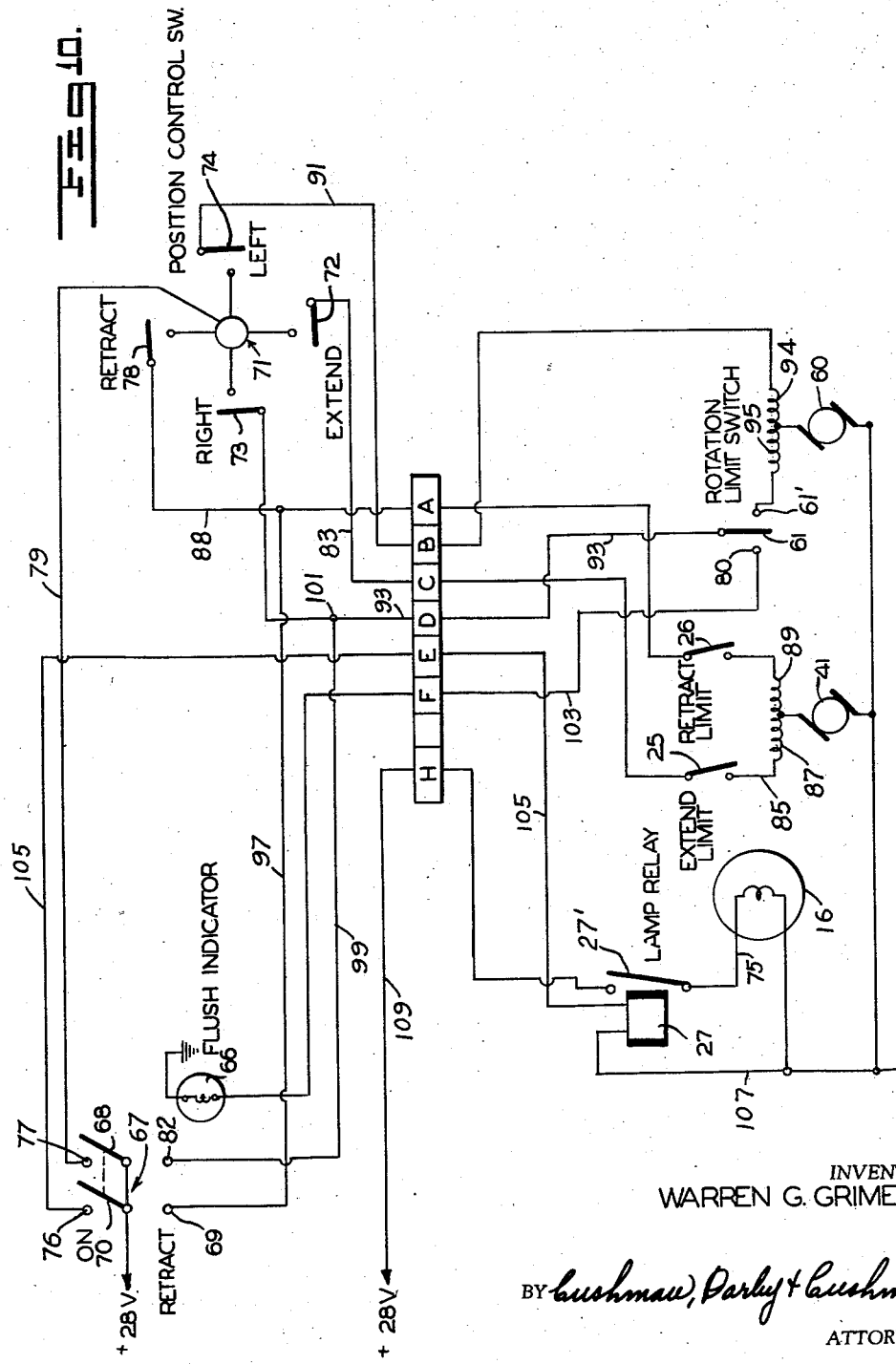

United States Patent Office 2,859,331
Patented Nov. 4, 1958

2,859,331

DIRIGIBLE EXTENDIBLE AND RETRACTABLE AIRCRAFT LANDING LIGHT

Warren G. Grimes, Urbana, Ohio

Continuation of application Serial No. 319,628, November 10, 1952. This application November 10, 1955, Serial No. 546,232

9 Claims. (Cl. 240—7.7)

This invention relates to a dirigible extendible and retractable aircraft landing light and has for an object to provide an improved landing light for use on aircraft, both of the conventional type and of the helicopter type, wherein the light when not in operation is normally located flush in the surface of the airplane wing or other aircraft part.

This case is a continuation of Grimes application, Serial No. 319,628, filed November 10, 1952, and now abandoned.

A further object of this invention is to provide a dirigible extendible and retractable landing light which has two motions; one motion is about a stationary horizontal axis perpendicular to the line of flight to extend and retract the light and thus act as a regular retractable landing light; and the second motion is about a movable axis, initially horizontal and parallel to the line of flight, permitting rotation either to the right or to the left. When the light is extended 90°, the movable axis is vertical.

A further object of this invention is to provide an extendible and retractable landing light usable on all types of aircraft, including helicopters, but particularly useful on helicopters while the helicopter is hovering or moving slowly over a small area, so that the light may be extended and rotated in either direction to any desired degree, thus, permitting the entire area beneath the slowly moving or hovering helicopter to be thoroughly explored, and thus, provide the pilot with all needed information as to the terrain below him. With the conventional type of winged airplane, the pilot may extend and rotate the light to any desired degree, thus, enabling him to light up the area below the aircraft and to keep the light on a particular area below him, as for instance, the edge of the landing field as he comes in for a landing, even though his normal non-dirigible landing light may have passed the particular spot which he wishes to investigate and observe.

Still a further object of this invention is to provide an extendible and retractable dirigible landing light having adjustable means for limiting the extension and retraction of the light to the desired pivots of extension and of retraction to a flush position in the surface skin of the aircraft part, and also to permit the lamp to be rotated without limit in either direction while it is in the at least partially extended position, and also to provide a means for limiting the rotation of the lamp in one direction, the right direction, for instance, when the lamp is in the fully retracted position, so as to bring the lamp lens flush with the skin or surface of the aircraft part, and simultaneously to operate a pilot indicator means, advising the pilot that the lamp has been fully retracted and has been rotated to the flush position, whereupon the pilot may operate an off switch to leave the lamp in such flush retracted position until such future time as he operates the same switch to the on position for powering the lamp and also the extending, retracting and rotating means.

Still a further object of this invention is to provide a dirigible, extendible and retractable landing light which may be made in several sizes for use on both large and small aircraft, wherein in any size, all the operating mechanism is mounted wholly within the aircraft part in which the lamp is to be flush, so that when the lamp is out of operation, it will not cause any impedance to the smooth flow of air over the skin of the aircraft part.

Still a further object of this invention is to provide a dirigible, extendible and retractable aircraft landing light wherein the lamp support remains within the aircraft part whether the lamp is extended or retracted and, wherein a lamp base is provided likewise within the aircraft part on which the lamp support is pivoted, and wherein, for larger size aircrafts a larger, and hence, heavier lamp is provided, the lamp support may have a lamp gimbal extending therefrom, so that the lamp may be additionally supported at its lower end when extended, and the lamp base may be provided with an extending lamp frame within which the gimbal will lie flush when in retracted flush position.

Still a further object of this invention is to provide a dirigible, extendible and retractable landing light which may be mounted flush within any aircraft part, such as the lower surface of a conventional type of aircraft wing, or of the fuselage thereof, as well as the lower or other surface of the fuselage or cabin of a helicopter.

With the foregoing and other objects in view, this invention comprises the combination, construction and arrangement of parts hereinafter set forth, claimed and disclosed in the accompanying drawings, wherein:

Figure 1 is a top plan view of the retractable dirigible landing light of this invention looking at the top thereof from the inside of the airplane part in flush position;

Figure 2 is a side elevational view of Figure 1;

Figure 3 is a view similar to Figure 2 but with the lamp in advanced and rotated position;

Figure 4 is an end elevational view showing the light in flush position in full lines;

Figure 5 is an enlarged fragmentary sectional view taken along the line 5—5 of Figure 1;

Figure 6 is a view similar to Figure 5 but with the lamp in extended position;

Figure 7 is a vertical fragmentary sectional view taken along the line 7—7 of Figure 5, showing the lamp rotating gear mechanism;

Figure 8 is an enlarged vertical sectional view taken along the line 8—8 of Figures 5 and 9;

Figure 9 is an enlarged fragmentary sectional view taken along the line 9—9 of Figure 1, showing the electrical control mechanism in elevation, and Figure 10 is an electrical wiring diagram showing the control means as installed in an aircraft.

There is shown at 10 the dirigible, extendible and retractable landing light of this invention mounted flush in the skin or surface 11 of the aircraft part 12. The aircraft part 12 may be the wing of a conventional airplane or the bottom of the cabin of the helicopter or of the fuselage of a conventional airplane. Supported wholly within the aircraft part 12 is a lamp base 14 having its lower surface flush with the skin or outer surface of the lower surface 11 of the aircraft part 12. As shown, a lamp frame 15 extends integrally from the lamp base 14 and is secured to the skin 11 of the aircraft part 12 about an opening with respect to which the lamp 16 may be extended and retracted, so that when retracted, its lens will lie flush with the skin 11. This lamp frame 15 may be omitted in the case of small size lamp outfits for use on small airplanes, but is desirable in large size lamp outfits of heavy weight for use on large size aircraft.

Hinged to the lamp base 14 on the pivot pin 17 is the lamp support 18 through which is journalled a hollow supporting shaft 20 on which the lamp 16 is supported and controllably rotated.

Integrally extending from the lamp support 18 is a gimbal ring 21, and axially aligned with the hollow shaft 20 is a stub shaft 22 having its end secured by a nut 23 and journalled in the gimbal ring particularly useful in large size heavy weight lamp outfits. However, this supporting stub shaft and gimbal ring could be omitted in small size light weight lamp outfits for use on small aircraft just as the lamp frame 15 may be omitted.

Integrally extending from the lamp base 14 into the aircraft part 12 is a housing 24 within which is located the extend limit switch 25, the retract limit switch 26, the lamp relay 27, and the adjustable limit switch control means, such as the retract switch operating cam 28, and the extend limit switch operating cam 30. Both switch cams 28 and 30 are adjustably secured by means of securing screws 31 to a plate 32 fixedly secured on a shaft 33, which shaft 33 is journalled thorugh a rear wall 34 of housing 24 and has fixed thereon the gear sector 35 whose operation is controlled by a pinion gear 36 forming one end of a train of reduction gears, a pinion gear 37 forming the other end of this train of reduction gears and meshed with a gear 38 fixed on the shaft 40 of a reversible, electric motor 41, which is supported on a wing wall 42 integrally extending from the housing 24 and substantially in the plane of the housing wall 34.

This motor 41 is preferably of the type shown in applicant's prior patent, No. 2,340,052 and is a reversible type of electric motor with a built in brake which stops the operation of the motor and holds it in stop position whenever the power is off, and releases the brake so that the motor may operate whenever power is on in either direction.

Pivoted to the gear sector 35 at 43 is a link 44, the other end of link 44 being pivoted at 45 to the lamp support 18. Operation of the motor 41 in one direction or the other will, through its gearing to gear sector 35 and link 44, cause the lamp support 18 to pivot in one direction or the other about its pivot 17, and thus, extend the lamp 16 below the aircraft part skin 11 or to retract it to flush position.

The power supply to the motor 41 is wired through extend limit switch 25 and retract limit switch 26, which are controlled by their adjustable cams 28 and 30 to cut off the power to the motor when the lamp lens and lamp gimbal are fully retracted to the flush position when the motor is being powered in that direction, and to cut off the extend position of the lamp at about 100° when the motor is being operated in the extend direction.

The lamp support 18 is in reality a housing through which the hollow lamp shaft 20 is journalled in bearings as at 50 and 51. Keyed to the shaft 20 is a gear 52 within the housing of the lamp base 18 and is in mesh with a worm 53. This worm gear 53 is mounted on a lamp shaft 54 journalled in the lamp base housing 18 and having one end formed into a female hex 55 accessible through an opening 56 in the side wall 57 of the lamp support housing 18. This female hex 55 is arranged to receive a complementary male hex 58 on the end of the motor shaft of a motor 60, the motor 60 being otherwise substantially identical with the motor 41. This motor 60 being reversible, operates through the worm 53 and shaft gear 52 to rotate the lamp shaft 20 in either direction, and thus, rotate the lamp 16 in either direction.

The lead to one side of the motor 60 for rotating in one direction is wired directly to contact 74 of the position control switch 71, while the lead to the other side of the motor, which may be the side for turning the lamp 16 in a right direction, is wired through a rotation limit switch 61 mounted on an integral flange 62 extending upwardly from the lamp base 14. Mounted on the end of the lamp shaft 20 is a rotation limit switch operating cam 65 provided with an integrally extending part 63 so that it may be adjustably secured by studs 64 relative to the hollow lamp shaft 20. Obviously, rotation limiting cam 65 can operate the rotation limit switch 61 only while the lamp 16 is either fully retracted or at most only a very few degrees from the fully retracted position, as beyond that position, the cam 65 may rotate freely without contacting the rotation limit switch. This will be apparent from Figure 1, in which it can be seen that when the lamp 16 is fully retracted, limit switch 61, mounted on the integral flange 62, may be contacted by rotating cam 65. When the lamp 16 is extended, as in Figure 3, cam 65 is far from flange 62 on which is mounted limit switch 61 (not seen in this figure). Hence, the cam 65 cannot contact limit switch 61 when the cam is in extended position.

The rotation limit switch 61 not only serves to cut off the power of rotation motor 60 when turning in that direction, but also serves to operate a flush position indicator lamp 66 located where it will be visible to the pilot to inform him that the lamp 16 has been fully retracted and has been rotated to the flush position. With this information, the pilot then may operate the main control switch 67 to the off position cutting off all the power both from the lamp and from the control motors.

The control circuit used for energizing the lamp 16 and for controlling the extension and retraction and rotation of the lamp can best be understood by referring to Figure 10. The main control switch 67 comprises a pair of contact elements 68 and 70. One end of each of the contact elements 68 and 70 is shown connected to the positive side of the power supply. When switch 67 is thrown upwardly, with respect to the view shown in Figure 10, switch element 70 engages terminal 76 and switch element 68 engages terminal 77. The switch 67 is then in its "on" position. When switch 67 is thrown downwardly, with respect to the view shown in Figure 10, the switch element 70 engages the terminal 69 and switch element 68 engages terminal 82. The switch 67 is then in its "retract" position. When switch 67 is in the intermediate position in which switch elements 68 and 70 engage none of the terminals 76, 77, 69, 82, the switch 67 is then in its "off" position.

A position control switch 71 is provided to control the movement of the light 16 to "extend" or "retract" position, as produced by rotation of motor 41, and to control the rotary movement of the light 16 to the right or to the left, as produced by motor 60. The position control switch 71 may be thrown into circuit with any one of the contacts 72, 78, 73, 74, to respectively cause the light 16 to extend, retract, rotate toward the right, or rotate toward the left.

When the main control switch 67 is thrown to its "on" position, in which switch elements 68 and 70 respectively engage terminals 76 and 77, the position control switch 71 is then connected to the source of electrical power in the following manner: from the positive side of the power source, through switch element 68 to terminal 77, through conductor 79 to position control switch 71.

At the same time, the "on" position of switch 67 completes the energization circuit of the filament of lamp 16 in the following manner: from the positive side of power, through switch element 70, through terminal 76, through conductor 105 to relay coil 27, through relay coil 27, through conductor 107 to ground, to thereby close the "E" circuit. Energization of relay coil 27 closes contact 27' and completes the "H" circuit as follows: from the positive side of power, through conductor 109, through contact 27', through conductor 75, through the filament of lamp 16 and thence to ground. As will be noted in Figure 5, wire 75 extends through the hollow shaft 20 to a wiper ring 76 and is connected to the power source through wiper brush 77 which is held in contact with the wiper ring by means of a spring 78.

If switch 71 is thrown into circuit with "extend" contact 72, the "C" circuit is completed to cause the light 16 to move to its extended position, as follows: from switch 71, through contact 72, through conductor 83, through extend limit switch 25, which is normally closed, through conductor 85 to the "extend" winding 87 of motor 41, through motor 41 to ground. This energizes motor 41 in such manner as to cause the light 16 to be moved in the extended direction as long as the operator maintains switch 71 closed through extend contact 72, or until the light reaches a sufficiently extended position to cause limit switch 25 to open.

If the position control switch 71 is thrown into circuit with the "retract" contact 78, the "A" circuit is completed to cause the light 16 to move in the retract direction, as follows: from switch 71, through contact 78, through conductor 88, through retract limit switch 26, through retract winding 89 of motor 41, through motor 41, and thence to ground. This will energize motor 41 in such manner as to cause the light 16 to be moved in the "retracted" direction as long as the operator maintains position control switch 71 closed through the retract contact 78, or until the light 16 reaches a sufficiently retracted position to cause the retract limit switch 26 to open the circuit.

With the lamp 16 is the desired position of extension, if the operator throws the position control switch 71 into circuit with the "left rotation" contact 74, the "B" circuit will be completed through motor 60 to cause the light 16 to rotate toward the left as follows: from switch 71, through contact 74, through conductor 91, through the "left rotation" winding 94 of motor 60, through motor 60 to ground. This will cause motor 60 to rotate in such a direction as to rotate the lamp 16 toward the left.

If the position control switch 71 is thrown into circuit with the "right rotation" contact 73, the "D" circuit will be completed as follows: from switch 71, through contact 73, through conductor 93, through normally closed rotation limit switch 61, to contact 61', through the "right rotation" winding 95 of motor 60, through motor 60 to ground. This will cause the motor 60 to rotate light 16 toward the right. Due to the presence of rotation limit switch 61 in the "right rotation" circuit, the motor 60 cannot be continuously operated in the "right rotation" direction when the light 16 is in fully retracted position, as previously explained, due to the fact that cam 65 opens limit switch 61 when the lamp reaches a flush position in its right rotation.

When the pilot no longer needs to use the lamp 16, the main control switch 67 is thrown in a downward direction with respect to the view shown in Figure 10, to the "retract" position, so that the switch element 70 contacts the terminal 69 and the switch element 68 contacts the terminal 82. By throwing the switch 67 to the retract position, the circuit of relay 27, which was formerly completed through switch element 70 and terminal 76, is broken, so that relay 27 becomes deenergized. This opens the relay contact 27' and the energization circuit of the filament of lamp 16 is therefore opened.

In the "retract" position of switch 67, "A" circuit is completed through switch 67 to operate the motor 41 in the retract direction as follows: from the positive side of the power line, through switch element 70 of switch 67, through terminal 69, through conductor 97, through retract limit switch 26, through retract winding 89 of motor 41, through motor 41 to ground. This causes the motor 41 to operate in such a direction as to retract the light 16 until it reaches its fully retracted position, at which time the circuit is broken by the opening of retract limit switch 26. When control switch 67 is thrown to "retract" position, the "D" is also completed through the "right rotation" winding of motor 60 to rotate the light 16 toward the right as follows: from the positive side of power, through switch element 68, to terminal 82, through conductor 99 to junction 101, through conductor 93, through normally closed rotation limit switch 61, through contact 61', through the "right rotation" winding 95 of motor 60, through motor 60 to ground. This causes the motor 60 to rotate toward the right so that when the lamp 16 is fully retracted the rotation of its shaft toward the right will cause the rotation limit cam 65 to actuate the rotation limit switch 61 and break the circuit to the motor 60, thus stopping the rotation of the lamp in the flush position of the lamp. At the same time, the cam 65 simultaneously moves the switch 61 to the position 80 to complete the circuit through the flush indicator lamp 66 as follows: from the positive side of power, through switch element 68 of switch 67 to terminal 82, through conductor 99 to junction 101, through conductor 93, through the limit switch 61, through contact 80, through conductor 103, through the flush indicator lamp 66 to ground. This causes the flush indicator lamp 66 to be lighted, thus advising the pilot that the lamp 16 has been fully retracted and rotated to the flush position, whereupon the pilot may then move the control switch 67 to its "off" position, thus cutting off all power to the system.

When the lamp frame 15 is present with the heavy lamp on a large size airplane, it will be provided with cushion blocks 81 for the gimbal ring 21 to abut against when it is moved to the fully retracted position.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A dirigible extendible and retractable landing light for aircraft, comprising in combination, a lamp supporting base mounted adjacent an opening in a surface of the aircraft, a lamp support pivotally mounted on said base, a lamp housing carried by said support for movement into and out of the opening in the aircraft surface and, when in retracted position, closing such opening and being in substantially flush relation with the outer surface of the aircraft, a shaft fixed to said lamp housing and rotatably mounted in said lamp support, first electric motor means drivingly connected to said shaft for rotation of the latter, means for selectively energizing said motor means to rotate said shaft and lamp housing, means in electrical association with said motor means for automatically deenergizing said motor means when said lamp housing is fully retracted into the opening in the aircraft, and second electric motor means for selectively extending and retracting said lamp housing, and means for limiting the travel of said lamp housing in either extending or retracting direction.

2. A light assembly of the character described in claim 1 wherein said lamp housing lies substantially on one side of the pivotal connection of said support to said base and said first motor means lies substantially on the opposite side of said pivotal connection.

3. A light assembly of the character described in claim 1 wherein said lamp support has a pivotal movement of the order of 100° outwardly from said inward position and said first motor means is so positioned with respect to the pivot of said support on said base that the first motor means will not move any substantial distance outwardly with respect to said base when said support is in extended position.

4. A light assembly of the character described in claim 1 wherein said second electric motor means is positioned on said base adjacent one axial end of the pivotal connection between said base and said lamp support, and said first electric motor means to rotate said housing is carried by said support adjacent the opposite axial end of said pivotal connection.

5. A dirigible extendible and retracable landing light for aircraft, comprising in combination, a lamp supporting base mounted interiorly of a part of the aircraft and flush with the inner surface thereof, said part having an opening immediately adjacent said base, a lamp support pivotally mounted on said base for movement into and out of said opening, a lamp carried by said support and, when in retracted position, normally closing said opening in flush relation with the outer surface of said part, a shaft fixed to said lamp, means rotatably mounting said shaft in said lamp support, reversible electric motor means mechanically connected to said shaft for complete rotation thereof, said means comprising a circular gear surrounding said shaft and a worm gear driven by said motor means and engaging said circular gear, means for selectively energizing said reversible motor means in either direction to rotate said shaft and hence said lamp in a selected direction, means in electrical association with said motor for automatically deenergizing said motor when said lamp is fully retracted and rotated into flush relation with said part of said aircraft closing said opening, second electric motor means for selectively extending and retracting said lamp, means for limiting the travel of said lamp in either extending or retracting direction, a source of power, a connection between each of said motors and said source of power, means extending from said connection for illuminating said lamp, and a main switch for energizing and deenergizing said source of power.

6. A dirigible extendible and retractable landing light for aircraft, comprising in combination, a lamp supporting base mounted interiorly of a part of the aircraft and flush with the inner surface thereof, said part having an opening immediately adjacent said base, a lamp support pivotally mounted on said base for movement into and out of said opening, a lamp carried by said support and, when in retracted position, normally closing said opening in flush relation with the outer surface of said part, a shaft fixed to said lamp, means rotatably mounting said shaft in said lamp support, reversible electric motor means mechanically connected to said shaft for complete rotation thereof, means for selectively energizing said reversible motor means in either direction to rotate said shaft and hence said lamp in a selected direction, means in electrical association with said motor for automatically deenergizing said motor when said lamp is fully retracted and rotated into flush relation with said part of said aircraft closing said opening, said means including a cam on the inner end of said shaft and a limit switch positioned for engagement by said cam only when said shaft is in horizontal position relative to the normally horizontal position of said cam, and said lamp is in flush relation to said part, completely closing said opening, second electric motor means for selectively extending and retracting said lamp, means for limiting the travel of said lamp in either extending or retracting direction, a source of power, a connection between each of said motors and said source of power, means extending from said connection for illuminating said lamp, and a main switch for energizing and deenergizing said source of power.

7. A dirigible extendible and retractable landing light for aircraft, comprising in combination, a lamp supporting base mounted interiorly of a part of the aircraft and flush with the inner surface thereof, said part having an opening immediately adjacent said base, a lamp support pivotally mounted on said base for movement into and out of said opening, a lamp carried by said support and, when in retracted position, normally closing said opening in flush relation with the outer surface of said part, a shaft fixed to said lamp, means rotatably mounting said shaft in said lamp support, reversible electric motor means mechanically connected to said shaft for complete rotation thereof, said means comprising a circular gear surrounding said shaft and a worm gear driven by said motor means and engaging said circular gear, means for selectively energizing said reversible motor means in either direction to rotate said shaft and hence said lamp in a selected direction, said means comprising a remotely located position control switch in electrical association with said electric motor, means in electrical association with said motor for automatically deenergizing said motor when said lamp is fully retracted and rotated into flush relation with said part of said aircraft closing said opening, said means including a cam on the inner end of said shaft and a limit switch positioned for engagement by said cam only when said shaft is in horizontal position relative to the normally horizontal position of said cam and said lamp is in flush relation to said part, completely closing said opening, second electric motor means for selectively extending and retracting said lamp, means for limiting the travel of said lamp in either extending or retracting direction, a source of power, a connection between each of said motors and said source of power, means extending from said connection for illuminating said lamp, and a main switch for energizing and deenergizing said source of power.

8. A dirigible extendible and retractable landing light for aircraft, comprising in combination, a lamp supporting base mounted interiorly of a part of the aircraft and flush with the inner surface thereof, said part having an opening immediately adjacent said base, a lamp support pivotally mounted on said base for movement into and out of said opening, a lamp carried by said support and, when in retracted position, normally closing said opening in flush relation with the outer surface of said part, a hollow shaft fixed to said lamp, means rotatably mounting said shaft in said lamp support, reversible electric motor means mechanically connected to said shaft for complete rotation thereof, means for selectively energizing said reversible motor means in either direction to rotate said shaft and hence said lamp in a selected direction, means in electrical association with said motor for automatically deenergizing said motor when asid lamp is fully retracted and rotated into flush relation with said part of said aircraft, closing said opening, said means including a cam on the inner end of said shaft and a limit switch positioned for engagement by said cam only when said shaft is in horizontal position relative to the normally horizontal position of said cam and said lamp is in flush relation to said part, completely closing said opening, second electric motor means for selectively extending and retracting said lamp, said means including a pinion driven by said motor means, a sector gear engaged by said pinion, a link pivoted at one end to said sector gear and at its other end to said lamp support, means for limiting the travel of said sector gear in either extending or retracting direction, a source of power, a connection between each of said motors and said source of power, means extending from said connection through said shaft for illuminating said lamp, and a main switch for energizing and deenergizing said source of power, said switch being of the double throw variety, when in one position passing said power through said position switch for extending, illuminating, and/or rotating said lamp, and when in its other position operable to deenergize and retract said lamp.

9. A dirigible extendible and retractable landing light for aircraft, comprising in combination, a lamp supporting base mounted interiorly of a part of the aircraft and flush with the inner surface thereof, said part having an opening immediately adjacent said base, a lamp support pivotally mounted on said base for movement into and out of said opening, a lamp carried by said support and, when in retracted position, normally closing said opening in flush relation with the outer surface of said part, a hollow shaft fixed to said lamp, means rotatably mounting said shaft in said lamp support, reversible electric motor means mechanically connected to said shaft for complete rotation thereof, said means comprising a circular gear surrounding said shaft and a worm gear driven by said motor means and engaging said circular gear, means for selectively energizing said reversible motor means in either direction to rotate said shaft and hence said lamp in a selected direction, said means comprising a remotely located position control switch in electrical association with said electric motor, means in electrical association with said motor for automatically deenergizing said motor when said lamp is fully retracted and rotated into flush relation with said part of said aircraft closing said opening, said means including a cam on the inner end of said shaft and a limit switch positioned for engagement by said cam only when said shaft is in horizontal position relative to the normally horizontal position of said aircraft and said lamp is in flush relation to said part, completely closing said opening, second electric motor means for selectively extending and retracting said lamp, said means including a pinion driven by said motor means, a sector gear engaged by said pinion, a link pivoted at one end to said sector gear and at its other end to said lamp support, means for limiting the travel of said sector gear in either extending or retracting direction, said means including a pair of cam members rotatable by said sector gear, and a pair of limit switches in the path of rotation of said last mentioned cam members for selective engagement by one of said cams in accordance with the direction of rotation thereof, means for the adjustment of said cams in accordance with predetermined limits of extension and retraction, a source of power, a connection between each of said motors and said source of power, means extending from said connection through said shaft for illuminating said lamp, and a main switch for energizing and deenergizing said source of power, said switch being of the double throw variety, when in one position passing said power through said position switch for extending, illuminating, and/or rotating said lamp, and when in its other position operable to deenergize and retract said lamp, and a remote flush position indicator operable when said main switch is in said other position and said lamp is in retracted flush position.

References Cited in the file of this patent
UNITED STATES PATENTS

| | | |
|---|---|---|
| 1,985,611 | Lemm | Dec. 25, 1934 |
| 2,124,050 | Bruner | July 19, 1938 |
| 2,124,346 | Grimes | July 19, 1938 |
| 2,390,634 | Aufiero | Dec. 11, 1945 |
| 2,401,390 | Unger | June 4, 1946 |
| 2,510,818 | Grimes | June 6, 1950 |

FOREIGN PATENTS

| | | |
|---|---|---|
| 326,162 | Great Britain | Mar. 3, 1930 |